United States Patent
Flint et al.

(10) Patent No.: US 12,042,768 B2
(45) Date of Patent: Jul. 23, 2024

(54) APPARATUSES, METHODS, AND SYSTEMS FOR FABRICATING GRAPHENE MEMBRANES

(71) Applicant: 2599218 ONTARIO INC., Toronto (CA)

(72) Inventors: Ian Flint, Bedford (CA); Raymond Williamson, Toronto (CA)

(73) Assignee: 2599218 ONTARIO INC., Toronto (CA)

( * ) Notice: Subject to any disclaimer, the term of this patent is extended or adjusted under 35 U.S.C. 154(b) by 121 days.

(21) Appl. No.: 17/613,135

(22) PCT Filed: Jun. 10, 2020

(86) PCT No.: PCT/CA2020/050789
§ 371 (c)(1),
(2) Date: Nov. 22, 2021

(87) PCT Pub. No.: WO2020/248048
PCT Pub. Date: Dec. 17, 2020

(65) Prior Publication Data
US 2022/0212148 A1      Jul. 7, 2022

Related U.S. Application Data

(60) Provisional application No. 62/860,829, filed on Jun. 13, 2019.

(51) Int. Cl.
*B01D 67/00* (2006.01)
*B01D 69/10* (2006.01)
(Continued)

(52) U.S. Cl.
CPC ....... *B01D 67/0046* (2013.01); *B01D 69/108* (2022.08); *B01D 71/0212* (2022.08);
(Continued)

(58) Field of Classification Search
None
See application file for complete search history.

(56) References Cited

U.S. PATENT DOCUMENTS

| 3,457,171 A | 7/1969 | Flowers et al. |
| 8,361,321 B2 | 1/2013 | Stetson et al. |
| (Continued) | | |

FOREIGN PATENT DOCUMENTS

| CN | 102671549 A | 9/2012 |
| JP | 2016159230 A | 9/2016 |
| (Continued) | | |

OTHER PUBLICATIONS

Extended European Search Report issued on Jun. 15, 2023 in EP 20822812.2.
(Continued)

*Primary Examiner* — Jethro M. Pence
(74) *Attorney, Agent, or Firm* — ABM INTELLECTUAL PROPERTY INC.; Adrienne Bieber McNeil

(57) ABSTRACT

An apparatus for fabricating a graphene membrane includes a first section having a first fluid chamber for housing a suspension of graphene platelets in a fluid. A second section is positionable adjacent the first section. The second section has a second fluid chamber and a porous support housed in the second fluid chamber for supporting a porous substrate. When the first section is positioned adjacent to the second section and the porous substrate is supported by the porous support, the first fluid chamber and the second fluid chamber are in fluid communication via the porous substrate. The apparatus further includes a pressurizer for creating a pressure differential between the first fluid chamber and the second fluid chamber and thereby forcing the fluid through (Continued)

the porous substrate and into the second fluid chamber and lodging the graphene platelets in the pores of the porous substrate.

11 Claims, 2 Drawing Sheets

(51) Int. Cl.
*B01D 71/02* (2006.01)
*B01J 20/20* (2006.01)
*B01J 20/24* (2006.01)
*B01J 20/26* (2006.01)
*B01J 20/28* (2006.01)
*B01J 20/32* (2006.01)
*B05C 3/109* (2006.01)
*C01B 32/194* (2017.01)

(52) U.S. Cl.
CPC ............ *B01J 20/205* (2013.01); *B01J 20/24* (2013.01); *B01J 20/26* (2013.01); *B01J 20/28035* (2013.01); *B01J 20/28038* (2013.01); *B01J 20/3208* (2013.01); *B01J 20/324* (2013.01); *B01J 20/3297* (2013.01); *B05C 3/109* (2013.01); *C01B 32/194* (2017.08); *B01D 2323/28* (2013.01); *B01D 2323/42* (2013.01); *B01D 2323/50* (2013.01)

(56) References Cited

U.S. PATENT DOCUMENTS

| | | | |
|---|---|---|---|
| 8,871,296 | B2 | 10/2014 | Zhamu et al. |
| 9,017,474 | B2 | 4/2015 | Geim et al. |
| 9,095,823 | B2 | 8/2015 | Fleming |
| 9,120,676 | B2 * | 9/2015 | Miller .................... B82Y 30/00 |
| 9,318,591 | B2 | 4/2016 | Geim et al. |
| 9,548,364 | B2 | 1/2017 | Geim et al. |
| 9,844,758 | B2 | 12/2017 | Nair et al. |
| 10,201,784 | B2 | 2/2019 | Stoltenberg et al. |
| 10,345,490 | B2 | 7/2019 | Geim et al. |
| 10,651,490 | B2 | 5/2020 | Lozada et al. |
| 10,835,873 | B2 | 11/2020 | Majumder et al. |
| 11,453,593 | B2 * | 9/2022 | Lin ........................ C01B 32/23 |
| 2013/0011304 | A1 | 1/2013 | Schumann |
| 2013/0270188 | A1 | 10/2013 | Karnik et al. |
| 2014/0151288 | A1 | 6/2014 | Miller et al. |
| 2015/0141711 | A1 | 5/2015 | Chu et al. |
| 2015/0258506 | A1 | 9/2015 | Mi et al. |
| 2016/0280563 | A1 | 9/2016 | Raveendran-Nair et al. |
| 2016/0297693 | A1 | 10/2016 | Raveendran-Nair et al. |
| 2016/0310908 | A1 | 10/2016 | Yu |
| 2016/0339160 | A1 | 11/2016 | Bedworth et al. |
| 2017/0036174 | A1 * | 2/2017 | Stetson, Jr. ............. C02F 1/442 |
| 2017/0036911 | A1 | 2/2017 | Swett et al. |
| 2017/0040082 | A1 | 2/2017 | Swett et al. |
| 2017/0174537 | A1 | 6/2017 | Zheng et al. |
| 2017/0260054 | A1 | 9/2017 | Yu et al. |
| 2018/0001267 | A1 | 1/2018 | Lee et al. |
| 2018/0154316 | A1 | 6/2018 | Nair et al. |
| 2018/0170002 | A1 | 6/2018 | Park et al. |
| 2018/0290108 | A1 | 10/2018 | Fanchini et al. |
| 2019/0070566 | A1 | 3/2019 | Kidambi et al. |
| 2020/0001245 | A1 | 1/2020 | Karnik et al. |
| 2020/0016547 | A1 | 1/2020 | Zheng et al. |
| 2020/0047132 | A1 | 2/2020 | Rempe et al. |
| 2020/0061546 | A1 | 2/2020 | Raveendran-Nair et al. |
| 2020/0108353 | A1 | 4/2020 | Nair et al. |
| 2020/0147558 | A1 | 5/2020 | Yu et al. |
| 2020/0215496 | A1 | 7/2020 | Raveendran-Nair et al. |
| 2020/0324253 | A1 | 10/2020 | Loh et al. |
| 2020/0384422 | A1 | 12/2020 | Liu |
| 2021/0016232 | A1 | 1/2021 | Liu |
| 2021/0086142 | A1 | 3/2021 | Liu |
| 2022/0072483 | A1 | 3/2022 | Liu et al. |
| 2022/0080360 | A1 | 3/2022 | Raveendran et al. |

FOREIGN PATENT DOCUMENTS

| | | | |
|---|---|---|---|
| JP | 2017500195 | A | 1/2017 |
| KR | 20180000781 | A | 1/2018 |
| WO | 2014152407 | A1 | 9/2014 |
| WO | 2016200118 | A1 | 12/2016 |
| WO | 2018138486 | | 9/2018 |
| WO | 2020000086 | A1 | 1/2020 |
| WO | 2020152441 | A1 | 7/2020 |

OTHER PUBLICATIONS

Wei-Song Hung, Quan-Fu An, Manuel De Guzman, Hsin-Yi Lin, Shu-Hsien Huang, Wei-Ren Liu, Chien-Chieh Hu, Kueir-Rarn Lee, Juin-Yih Lai, Pressure-assisted self-assembly technique for fabricating composite membranes consisting of highly ordered selective laminate layers of amphiphilic graphene oxide, Carbon, vol. 68, 2014,pp. 670-677, ISSN 0008-6223, https://doi.org/10.1016/j.carbon.2013.11.048. (https://www.sciencedirect.com/science/article/pii/S0008622313011123).

Yang Yong-Hui, Sun Hong-Juan, Peng Tong-Jiang, Huang Qiao. Synthesis and Structural Characterization of Graphene-Based Membranes[J].Acta Phys.—Chim. Sin., 2011, 27(03): 736-742.

Office Action Issued in Canadian Patent Application No. 3140950 on Oct. 19, 2023.

Office Action issued on Apr. 19, 2023 in Singapore patent application No. 11202110488P.

Ibrahim AMR FM et al: "Synthesis of graphene oxide membranes on polyester substrate by spray coating for gas separation", Chemical Engineering Science, Oxford, GB, vol. 190, Jun. 20, 2018 (Jun. 20, 2018), pp. 312-319, XP085431817, ISSN: 0009-2509, DOI: 10.1016/J.CES.2018.06.031.

Gongping Liu, Wanqin Jin, Nanping Xu; Graphene-based Membranes; Chemical Society Reviews; 2015; 00, 1-10.

International Search Report & Written Opinion of the International Searching Authority Mailed on Aug. 26, 2020 in PCT Application No. PCT/CA2020/050789.

Study of Ion and Solvent Transport through Graphene Oxide Membranes; Kai Wang; A thesis presented to the University of Waterloo in fulfillment of the thesis requirement for the degree of Master of Science in Chemistry; Waterloo, Ontario, Canada, 2016.

Yi Han, Zhen Xu, Chao Gao; "Ultrathin Graphene Nanofi Itration Membrane for WaterPurification"; Advanced Functional Materials; 2013;23,3693-3700.

Zhu et al. "Membranes prepared from graphene-based nanomaterials for sustainable applications: a review", Environ. Sci. Nano., 2017, 4, 2267-2285.

Communication pursuant to Article 94(3) issued by European Patent Office on Jan. 2, 2024 in EP 20822812.2.

Weng, Z., Su, Y., Wang, D.-W., Li, F., Du, J. and Cheng, H.-M. (2011), Graphene-Cellulose Paper Flexible Supercapacitors. Adv. Energy Mater., 1: 917-922. https://doi.org/10.1002/aenm.201100312.

Office Action issued in Japanese Patent Application No. 2021-564265 on Apr. 25, 2024.

* cited by examiner

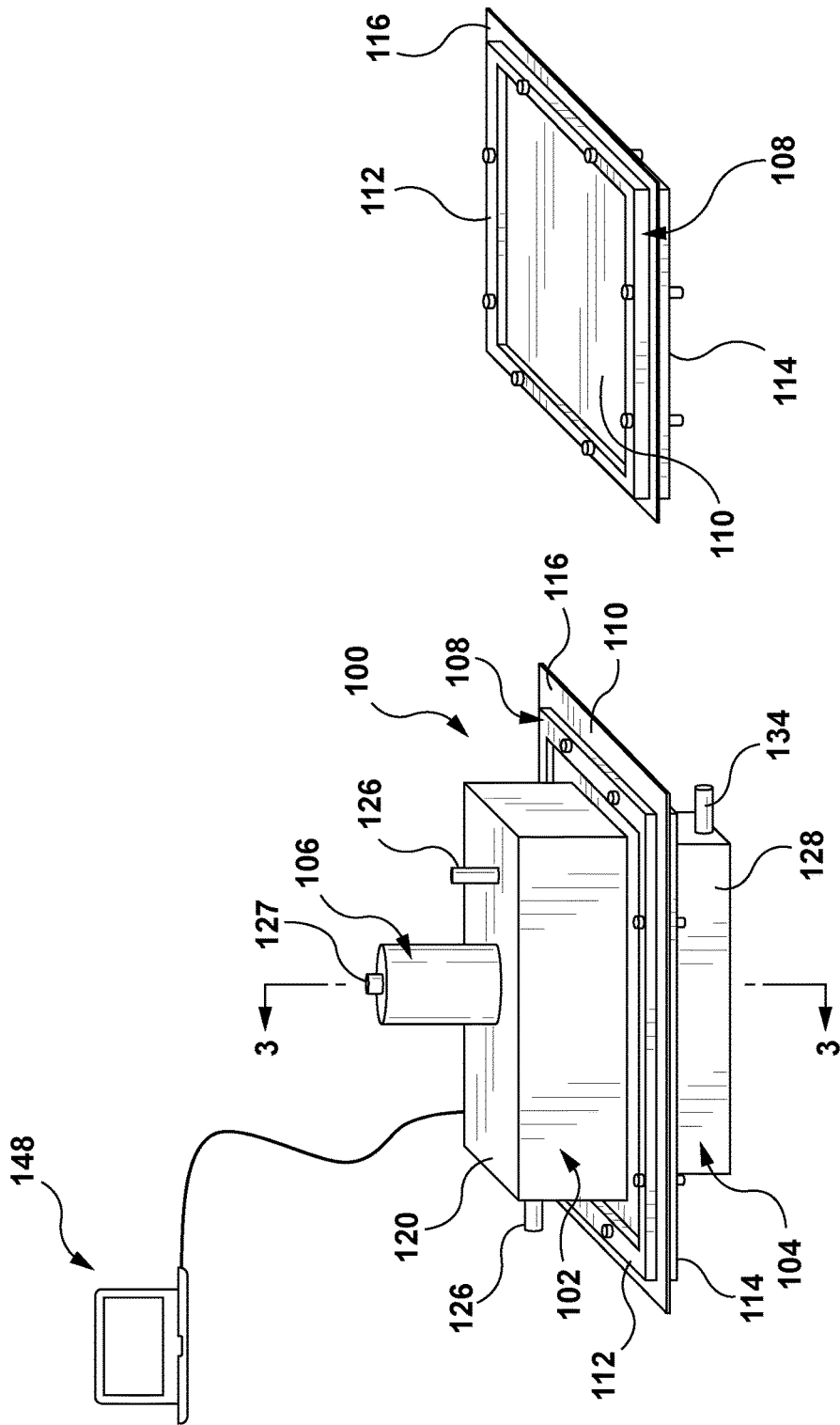

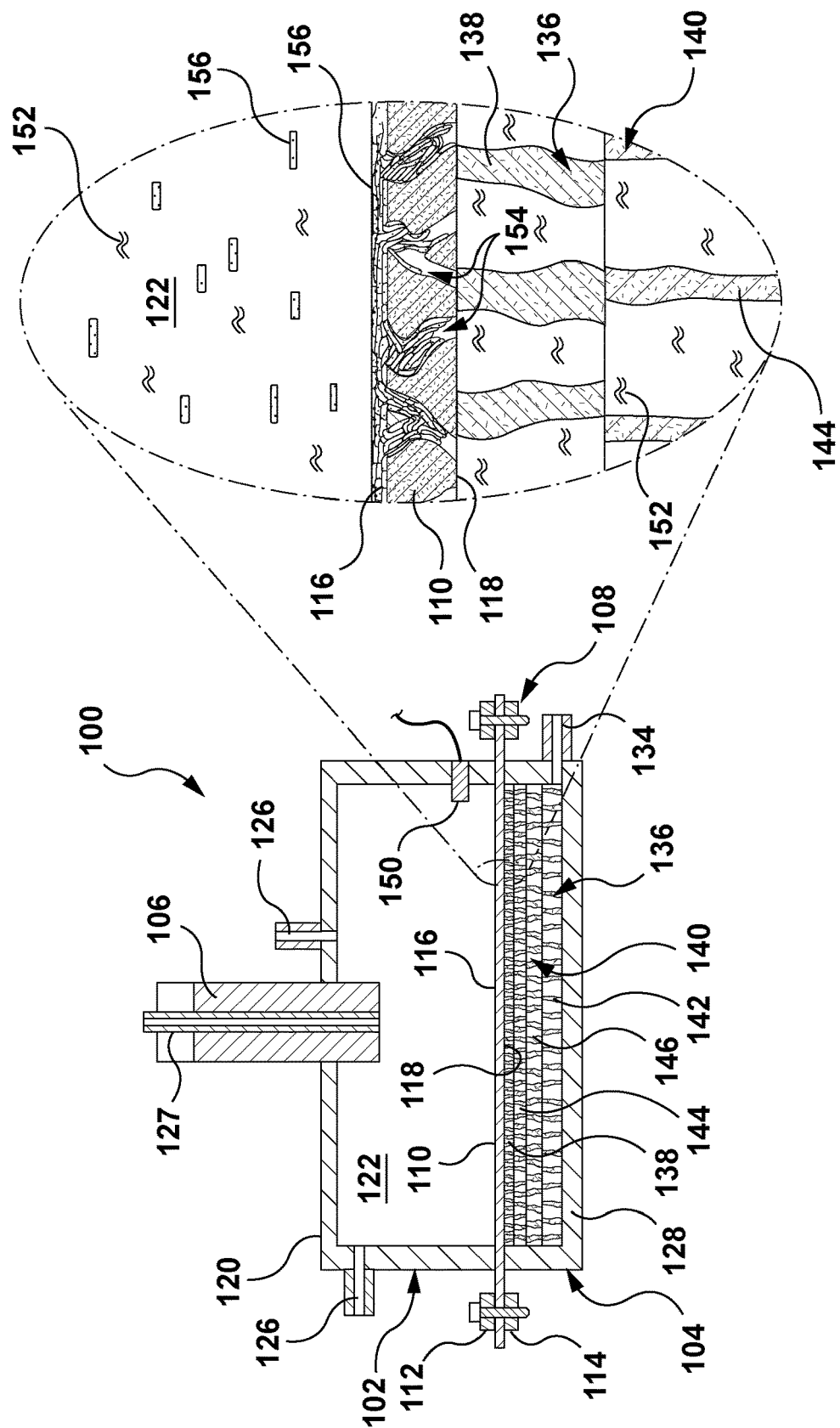

APPARATUSES, METHODS, AND SYSTEMS FOR FABRICATING GRAPHENE MEMBRANES

CROSS REFERENCES TO RELATED APPLICATIONS

This application is a national stage entry of International Patent Application No. PCT/CA2020/050789, which claims the benefit of and/or priority to U.S. Provisional Patent Application No. 62/860,829 filed on Jun. 13, 2019, both of which is are incorporated herein by reference in their entirety.

FIELD

This document relates to graphene membranes. More specifically, this document relates to apparatuses and methods for fabricating graphene membranes.

BACKGROUND

US Patent Application Publication No. 2016/0339160 A1 (Bedworth et al.) discloses various systems and methods relating to two-dimensional materials such as graphene. A membrane includes a cross-linked graphene platelet polymer that includes a plurality of cross-linked graphene platelets. The cross-linked graphene platelets include a graphene portion and a cross-linking portion. The cross-linking portion contains a 4 to 10 atom link. The cross-linked graphene platelet polymer is produced by reaction of an epoxide functionalized graphene platelet and a (meth)acrylate or (meth)acrylamide functionalized cross-linker.

SUMMARY

The following summary is intended to introduce the reader to various aspects of the detailed description, but not to define or delimit any invention.

Apparatuses for fabricating graphene membranes are disclosed. According to some aspects, an apparatus for fabricating a graphene membrane includes a first section having a first fluid chamber for housing a suspension of graphene platelets in a fluid. A second section is positionable adjacent the first section. The second section includes a second fluid chamber, and a porous support housed in the second fluid chamber for supporting a porous substrate. When the first section is positioned adjacent the second section and the porous substrate is supported by the porous support, the first fluid chamber and the second fluid chamber are in fluid communication via the porous substrate. The apparatus further includes a pressurizer for creating a pressure differential between the first fluid chamber and the second fluid chamber and thereby forcing the fluid through the porous substrate and into the second fluid chamber and lodging the graphene platelets in the pores of the porous substrate.

In some examples, the porous support includes a first layer having pores of a first size, a second layer having pores of a second size larger than the first size, and a third layer having pores of a third size larger than the second size. The first layer can include a sheet of at least one of cellulose, a fabric, and a polymer. The second layer can include a first sub-layer of a sintered polymer or a porous metal, and a second sub-layer of a sintered polymer or a porous metal.

In some examples, the pressurizer is configured to pressurize the first fluid chamber. The pressurizer can include a hydraulic cylinder, a compressed air cylinder, or a high-pressure water pump.

In some examples, the pressurizer includes a vacuum apparatus for creating a vacuum in the second fluid chamber.

In some examples, the apparatus further includes an ultrasonic transducer in the first fluid chamber.

In some examples, the apparatus further includes a substrate support frame having a first piece and a second piece. The porous substrate can be securable between the first piece and the second piece. The substrate support frame can be maneuverable to position the porous substrate on the porous support.

In some examples, when the first section is positioned adjacent the second section and the porous substrate is supported by the porous support, the substrate support frame is outboard of the first fluid chamber and the second fluid chamber.

In some examples, the apparatus further includes at least one sensor for sensing a parameter of the suspension, and/or the fluid, and/or the graphene platelets.

Methods for fabricating graphene membranes are also disclosed. According to some aspects, a method for fabricating a graphene membrane includes a) positioning a porous substrate across a porous support. The porous substrate has a first surface and a second surface, and the porous substrate is positioned so that the first surface faces away from the porous support and the second surface faces towards the porous support. The method further includes b) applying a suspension of graphene platelets in a fluid to a first fluid chamber, to contact the first surface of the porous substrate with the suspension; and c) applying a pressure differential across the porous substrate to force the graphene platelets into the pores of the porous substrate and force the fluid through the porous substrate.

In some examples, step c) includes pressurizing the first fluid chamber. In some examples, step c) includes applying a vacuum to the porous support.

In some examples, the method includes sonicating the suspension during step b) and/or step c).

In some examples, the method further includes, prior to step a), mounting the porous substrate in a substrate support frame. Step a) can include maneuvering the substrate support frame to position the porous substrate across the porous support. The method can further include, after step c), removing the substrate support frame and the porous substrate from the porous support.

In some examples, the method further includes, during step c), sensing a parameter of the suspension and/or the fluid.

In some examples, step c) includes passing the fluid through a first layer, a second layer, and a third layer of the porous support.

Systems for fabricating graphene membranes are also disclosed. According to some aspects, a system for fabricating a graphene membrane includes an apparatus and a control sub-system. The apparatus includes a first section having a first fluid chamber for housing a suspension of graphene platelets in a fluid. The apparatus further includes a second section that is positionable adjacent the first section and having a second fluid chamber and a porous support housed in the second fluid chamber for supporting a porous substrate. When the first section is positioned adjacent the second section and the porous substrate is supported by the porous support, the first fluid chamber and the second fluid chamber are in fluid communication via the porous substrate. The apparatus further includes at least one sensor for sensing a parameter of the suspension and/or the fluid. The apparatus further includes a pressurizer for creating a pressure differential between the first fluid chamber and the second fluid chamber and thereby forcing the fluid through the porous substrate and into the second fluid chamber and lodging the graphene platelets in the pores of the porous substrate. The control sub-system can receive information from the sensor and can control the apparatus based on the received information

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 1 is a perspective view of a system for fabricating a graphene membrane;

FIG. 2 is a perspective view of the substrate support frame of the system of FIG. 1;

FIG. 3 is a cross-section taken along line 3-3 in FIG. 1; and

FIG. 4 is an enlarged view of the encircled region in FIG. 3.

DETAILED DESCRIPTION

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Generally disclosed herein are apparatuses, methods, and systems for fabricating graphene membranes. More specifically, disclosed herein apparatuses, methods, and systems for fabricating graphene membranes, where the graphene membranes include a porous substrate, and graphene platelets lodged in the pores of the porous substrate and/or deposited as a layer on the surface(s) of the porous substrate. Such graphene membranes are disclosed, for example, in international patent application (PCT) publication no. WO 2020/000086A1 (Flint et al.), U.S. patent application Ser. No. 16/542,456 (Flint et al.), and U.S. patent application Ser. No. 16/810,918 (Oguntuase), each of which is incorporated herein by reference in its entirety. Such graphene membranes may be used, for example, in water filtration and purification, or to form conductive surfaces (e.g. for use in batteries).

In general, the apparatuses disclosed herein can allow for a suspension of graphene platelets in a fluid to be applied to a porous substrate, and for a pressure differential to be created across the porous substrate, so that the suspension is forced into the pores of the porous substrate. The fluid can pass through the pores, while the graphene platelets are trapped in the pores, to create the membrane (i.e. where the membrane includes the porous substrate and the graphene platelets lodged in the pores of the porous substrate and/or deposited as a layer on the surface(s) of the porous substrate).

As used herein, the term "platelet" refers to a structure that includes one or multiple (e.g. at least two and up to nine) sheets of graphene. Preferably, platelets include two, or three sheets of graphene. A platelet can be, for example, up to 15 nanometers thick, with a diameter of up to 100 microns. As used herein, the term 'graphene platelet' can refer to a platelet of pure graphene (i.e. non-functionalized graphene) and/or a platelet of functionalized graphene. Functionalized graphene can include, for example, hydroxylated graphene (also referred to as graphene oxide), aminated graphene, and/or hydrogenated graphene. Functionalization of the graphene can create pores in the graphene, which can allow for flow of filtrates, and can create a desired spacing between graphene sheets. For example, in platelets of non-functionalized graphene, the interlayer spacing may be approximately 0.34 nm. In platelets of functionalized graphene, e.g. graphene that is functionalized as hydroxylated graphene (also known as graphene oxide), the interlayer spacing may be approximately 0.83 nm.

As used herein, the term "porous substrate" refers to a sheet-like material having pores extending therethrough, from a first surface thereof to a second surface thereof. The pores can have a diameter of, for example, less than or equal to 0.03 microns. Preferably, the pores are at most 5 times larger in diameter than the diameter of the graphene platelets. The substrate can have a thickness (i.e. between the first surface and the second surface) of, for example, less than 1 mm. In some examples the substrate is a polymer, such as but not limited to polytetrafluoroethylene (Teflon®), polysulfone (PsF) (also referred to as polyether sulfone), cellulose, and/or polyester. In some examples, the substrate is an acid-treated polymer, for example polysulfone treated with sulfuric acid. In some examples, the substrate is an acid-treated and ion-treated polymer, for example polysulfone may be treated with sulfuric acid and then with a solution of metal ions (e.g. aluminum or calcium ions). In some examples, the substrate is non-polymeric, such as a woven cotton.

A first example of an apparatus for fabricating a graphene membrane will now be described. Referring to FIG. 1, the apparatus 100 generally includes a first section 102, a second section 104, a pressurizer 106, and a substrate support frame 108. In the example shown, the first section 102 is an upper section, and the second section 104 is a lower section; however, in alternative examples, the first 102 and second 104 sections may be otherwise positioned (e.g. as a left-side section and a right-side section).

Referring also to FIG. 2, in use, a porous substrate 110 (which ultimately becomes part of the graphene membrane) is supported by the substrate support frame 108. The substrate support frame 108 has a first piece 112 and a second piece 114, between which the porous substrate 110 is securable (e.g. using bolts). The substrate support frame 108 can be used to ease handling of the porous substrate 110 and to prevent or minimize physical damage to the porous substrate 110. The substrate support frame 108 generally holds the porous substrate 110 flat (i.e. it can prevent bending, folding, and/or crimping).

Referring back to FIG. 1, in use, the substrate support frame 108 can facilitate positioning of the porous substrate 110 between the first section 102 and the second section 104, so that the porous substrate 110 is sandwiched between the first section 102 and the second section 104, with a first surface 116 of the porous substrate 110 facing towards the first section 102 and away from the second section 104, and a second surface 118 (shown in FIGS. 3 and 4) of the porous substrate 110 facing towards the second section 104 and away from the first section 102.

Referring now to FIG. 3, the first section 102 includes an outer wall 120 (also referred to herein as a "first outer wall") that defines a fluid chamber 122 (also referred to herein as a "first fluid chamber"). In use, as will be described in further detail below, the fluid chamber 122 houses a suspension of graphene platelets in a fluid.

In the example shown, the first section 102 includes a pair of fluid inlet ports 126 and an air escape port 127. In alternative examples, the first section 102 may include another number of fluid inlet ports, such as one fluid inlet port, and the fluid inlet ports may be in another position. The fluid inlet ports 126 may be opened and closed by a valve (not shown). Furthermore, the first section 102 may include another number of air escape ports, such as more than one air escape port, and the air escape port may be in another position. The air escape port 127 may be opened and closed by a valve (not shown).

The first section 102 can further include an ultrasonic transducer (not shown) for sonicating the suspension of graphene platelets, which can help to pack the graphene platelets into the pores of the porous substrate 110 (as described in further detail below).

Referring still to FIG. 3, the second section 104 includes an outer wall 128 (also referred to herein as a "second outer wall") that defines a fluid chamber (also referred to herein as a "second fluid chamber"). The second fluid chamber is not visible in the figures, as it is filled with a porous support 136, described below. In use, the second section 104 is positionable adjacent to the first section 102 so that the first outer wall 120 bears against the second outer wall 128, via the porous substrate 110. The second section 104 can further be secured to the first section 102, for example by clamping or bolting the first outer wall 120 to the second outer wall 128.

Referring still to FIG. 3, the second fluid chamber has a drain port 134. In alternative examples, additional drain ports can be provided (e.g. four drain ports).

Referring still to FIG. 3, the second section 104 further includes a porous support 136, which is housed within the second fluid chamber. In use, during fabrication of a graphene membrane, the porous support 136 supports the porous substrate 110 of the graphene membrane, so that when a pressure differential is applied across the porous substrate 110, the porous substrate does not tear or rip or break or stretch or otherwise incur damage. Furthermore, in use, when the first section 102 is positioned adjacent the second section 104 and the porous substrate 110 is supported by the porous support 136, the first fluid chamber 122 and the second fluid chamber are in fluid communication via the porous substrate 110;

In the example shown, the porous support 136 includes several layers, namely a first layer 138, a second layer 140, and a third layer 142. Each layer is porous, with the pore sizes larger than those of the porous substrate 110, and becoming larger going from the first layer 138 layer to the third layer 142. For example, the first layer 138 may have pore sizes on the scale of microns, the second layer 140 may have pore sizes on the scale of millimeters, and the third layer 142 may have pore sizes on the scale of inches.

In some examples, the first layer 138 includes a sheet of, for example, cellulose, fabric, and/or various polymers or other materials. In some examples, the first layer 138 includes more than one sheet of material. The first layer 138 can be in contact with and physically support the porous substrate 110 during fabrication of the graphene membrane.

In the example shown, the second layer 140 includes two sub-layers: a first sub-layer 144 and a second sub-layer 146. The first sub layer 144 and second sub-layer 146 can include, for example, porous materials such as sintered polymers, sintered metals, zeolites, and/or ceramics. In some particular examples, the first sub-layer 144 and second sub-layer 146 each include a plexiglass sheet with holes drilled therethrough, with the holes of the first sub-layer 144 being smaller than the holes of the second sub-layer 146. In use, the second layer 140 can contact and physically support the first layer 138, distribute forces caused by the pressure differential (described in more detail below), and direct fluid away from the porous substrate 110 (i.e. downwardly, in the example shown).

In the example shown, the third layer 142 generally serves to drain the second layer 140, and can be made from various materials having large pores, such as drilled plexiglass.

Referring still to FIG. 3, the pressurizer 106 can be any device or apparatus or assembly that in use, can create a pressure differential between the first section 102 and the second section 104 (i.e. between the first fluid chamber 122 and the second fluid chamber, across the porous substrate 110), to force the fluid of the suspension through the porous substrate 110 and into second fluid chamber and lodge the graphene platelets in the pores of the porous substrate 110. In the example shown, the pressurizer 106 is a hydraulic cylinder (shown schematically) that is connected to the first section 102, for pressurizing the fluid chamber 122 of the first section 102, while the second fluid chamber remains at atmospheric pressure (or below atmospheric pressure, e.g. using a vacuum apparatus). In alternative examples the pressurizer can be, for example, a compressed air cylinder, or a mechanical screw, or a high-pressure water pump, or a compressor. Alternatively, the pressurizer can be a vacuum apparatus and can create a vacuum in the second fluid chamber, while the first fluid chamber 122 remains at atmospheric pressure (or above atmospheric pressure). While in the example shown, the hydraulic cylinder moves vertically to pressurize the first fluid chamber 122, in alternative examples, a hydraulic cylinder can move horizontally.

Referring back to FIG. 1, in the example shown, the apparatus 100 is part of a system that includes a control sub-system 148. The control sub-system 148 can receive information from the apparatus 100 and/or can control the apparatus 100. For example, the apparatus 100 can include various sensors, such as pressure sensors and/or pH sensors and/or conductivity sensors and/or flow sensors. The control sub-system 148 can receive information from the sensors. Such information can relate, for example, to the pressure differential across the porous substrate 110, a concentration of ions in a suspension within the first fluid chamber 122 and/or second fluid chamber, a conductivity of the suspension within the first fluid chamber 122 and/or second fluid chamber, a flow rate across the porous substrate 110, and/or a conductivity of the porous substrate 110. Furthermore, the control sub-system 148 can control the apparatus 100 based on the received information. For example, the control sub-system 148 can control the pressure differential induced by the pressurizer 106, and/or the entry of fluid into the upper fluid chamber based on the information. In the example shown, a sensor is shown schematically at 150 in FIG. 3.

A method of fabricating a graphene membrane will now be described. The method will be described with reference to the apparatus 100; however, the method is not limited to the apparatus 100, and the apparatus 100 is not limited to operation by the method. In general, the method can include a) positioning the porous substrate 110 across the porous support 136 so that the first surface 116 faces away from the porous support 136 and the second surface 118 faces towards the porous support 136; b) applying a suspension of graphene platelets in a fluid to the fluid chamber 122 of the first section 102, to contact the first surface 116 of the porous substrate 110 with the suspension; and c) applying a pressure differential across the porous substrate 110 to force the graphene platelets into the pores of the porous substrate 110 and force the fluid through the porous substrate 110.

More specifically, in use, the porous substrate 110 may first be mounted in the substrate support frame 108, by securing the porous substrate 110 between the first 112 and second 114 pieces of the substrate support frame 108, as shown in FIG. 2. The apparatus 100 may then be assembled as shown in FIG. 3, with the substrate support frame positioned 108 outboard of the first fluid chamber 122 and the second fluid chamber, and with the porous substrate 110 sandwiched between the first outer wall 120 and the second outer wall 128 and supported by the porous support 136. This can be achieved by opening the apparatus 100 (i.e. separating the first section 102 and second section 104), maneuvering the substrate support frame 108 to lay the porous substrate 110 on the second section 104, closing the apparatus 100 (positioning the first section 102 adjacent the second section 104), and securing the first section 102 to the second section 104.

A suspension of graphene platelets in a fluid can then be applied to the first fluid chamber 122, so that the suspension is in contact with the first surface 116 of the porous substrate 110. For example, the suspension can be loaded into the first fluid chamber 122 via one of the fluid inlet ports 126.

A mentioned above, the suspension includes graphene platelets suspended in a fluid. The fluid can be, for example, a liquid or a gas. For example, the fluid can be or can include a liquid such as water, an alcohol, and/or an organic solvent (e.g. N-Methyl-2-pyrrolidone (NMP)). Alternatively, the fluid can be or can include a gas such as nitrogen gas, carbon dioxide, noble gases, water vapor, and/or hydrogen gas. In addition to the graphene platelets, various other materials can be suspended in or dissolved in the fluid. The additional materials can be micro- or nano-sized. For example, the suspension can include carbons (e.g. graphite and/or carbon nanotubes), ceramics (such as oxides, carbides, carbonates, and/or phosphates), metals (such as aluminum and/or iron), semiconductors, lipids, and/or polymers.

A pressure differential can then be applied across the porous substrate 110. As mentioned above, this can be achieved by pressurizing the first fluid chamber 122 and/or applying a vacuum to the second fluid chamber. In the example shown, the pressurizer 106 pressurizes the first fluid chamber 122. Referring to FIG. 4, as the pressure differential is applied, the suspension will be forced towards the second section 104. Particularly, as the pressure differential is applied, the fluid 152 (shown schematically) of the suspension will pass through the pores 154 of the porous substrate 110, while the graphene platelets 156 will become lodged within the pores 154, leaving behind a graphene membrane (i.e. a membrane that includes the porous substrate 110 with the graphene platelets 156 lodged within the pores 154 and/or on the first surface 116 of the porous substrate). Optionally, while the pressure differential is being applied, the suspension can be sonicated, in order to facilitate tight packing of the graphene platelets 156 within the pores 154.

After passing through the pores 154, the fluid 152 will pass into the second section 104, and through the first layer 138, second layer 140, and third layer 142 of the porous support 136. The fluid can then be drained via the drain port 134.

Optionally during pressurization, the control sub-system 148 can be used to receive information from the apparatus 100, and/or to control the apparatus 100.

Optionally, additional suspensions can be applied to the substrate. For example, a first suspension of a first type of graphene platelets (e.g. aminated graphene platelets) can be applied to the porous substrate 110. Then, a second suspension of a second type of graphene platelets (e.g. oxidized graphene platelets) can be applied to the porous substrate. This can result in a graphene membrane that includes several sub-layers of graphene.

Upon completion of fabrication of the membrane (e.g. when all of the fluid 152 of the suspension has passed from the first fluid chamber 122 into the second fluid chamber), the apparatus 100 can be disassembled (i.e. by separating the first section 102 and the second section 104), and the substrate support frame 108 and the graphene membrane (which includes the porous substrate 110 with the graphene platelets 156 lodged within the pores 154 of the porous substrate 110 and/or deposited as a layer on the porous substrate 110) can together be removed from the first section 102 and second section 104. The membrane can then optionally be removed from the substrate support frame 108, or can remain in the substrate support frame 108 for further processing steps.

In some examples, rather than loading the suspension into the first fluid chamber 122, the suspension can be made in the first fluid chamber 122. For example, the fluid and the graphene platelets can be added to the first fluid chamber 122 separately, and then combined in the first fluid chamber 122.

While the above describes a batch process for fabricating a graphene membrane, the apparatus 100 may alternatively be operated in a semi-batch fashion that approximates or simulates continuous operation. For example, the porous substrate 110 and the substrate support frame 108 can move through the first section 102 and second section 104, across the porous support 136. Furthermore, several of the apparatuses 100 may be operated in parallel or in series. When operating in series, each subsequent apparatus 100 can be used to deposit additional graphene platelets 156 onto/into the porous substrate 110, or to deposit additional materials onto/into the porous substrate 110. For example, the first apparatus in a series can deposit aminated graphene platelets into/onto the porous substrate 110, while the second apparatus in the series can deposit oxidized graphene platelets into/onto the porous substrate 110.

Optionally, the various parts of the apparatus 100 can be configured for removal, replacement, and cleaning.

While the above description provides examples of one or more processes or apparatuses or compositions, it will be appreciated that other processes or apparatuses or compositions may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

We claim:

1. An apparatus for fabricating a graphene membrane, comprising:
    a first section having a first outer wall and a first fluid chamber for housing a suspension of graphene platelets in a fluid;
    a second section having a second outer wall, a second fluid chamber, and a porous support housed in the second fluid chamber for supporting a porous substrate, wherein the first section is positioned to sandwich the porous substrate between the first section and the second section with the first outer wall bearing against the second outer wall via the porous substrate and with the porous substrate supported by the porous support, to place the first fluid chamber and the second fluid chamber in fluid communication via the porous substrate;
    a pressurizer for creating a pressure differential between the first fluid chamber and the second fluid chamber and thereby forcing the fluid through the porous substrate and into the second fluid chamber and lodging the graphene platelets in pores of the porous substrate to yield a graphene membrane that comprises the porous substrate with the graphene platelets lodged in the pores of the porous substrate.

2. The apparatus of claim 1, wherein the porous support comprises a first layer having pores of a first size, a second layer having pores of a second size larger than the first size, and a third layer having pores of a third size larger than the second size.

3. The apparatus of claim 2, wherein the first layer comprises a sheet of at least one of cellulose, a fabric, and a polymer.

4. The apparatus of claim 2, wherein the second layer comprises a first sub-layer and a second sub-layer.

5. The apparatus of claim 1, wherein the pressurizer is configured to pressurize the first fluid chamber.

6. The apparatus of claim 5, wherein the pressurizer comprises a hydraulic cylinder, a compressed air cylinder, or a high-pressure water pump.

7. The apparatus of claim 1, wherein the pressurizer comprises a vacuum apparatus for creating a vacuum in the second fluid chamber.

8. The apparatus of claim 1, further comprising an ultrasonic transducer in the first fluid chamber.

9. The apparatus of claim 1, further comprising a substrate support frame, wherein the porous substrate is secured to the substrate support frame, and wherein the substrate support frame is maneuvered to position the porous substrate on the porous support.

10. The apparatus of claim 9, wherein the substrate support frame is outboard of the first fluid chamber and the second fluid chamber.

11. The apparatus of claim 1, further comprising at least one sensor for sensing a parameter of the suspension and/or the fluid and/or the graphene platelets.

* * * * *